United States Patent [19]
Aliotta

[11] Patent Number: 4,755,270
[45] Date of Patent: Jul. 5, 1988

[54] METHOD OF PROCESSING SOLUTIONS

[76] Inventor: Joseph Aliotta, P.O. Box 186, Newton, Mass. 02161

[21] Appl. No.: 39,968

[22] Filed: Apr. 17, 1987

[51] Int. Cl.[4] .................................................. C22B 5/00

[52] U.S. Cl. .................................. 204/157.42; 75/108; 75/118 P; 423/1; 423/659; 423/DIG. 1; 423/DIG. 2; 423/DIG. 9

[58] Field of Search ...................... 204/157.42; 75/1 R, 75/118 P, 108; 423/1, 659, DIG. 1, DIG. 2, DIG. 9

[56] References Cited

U.S. PATENT DOCUMENTS 4,332,687 6/1982 Daignault et al. ................ 75/118 P
4,369,100 1/1983 Sawyer ........................... 204/157.42
4,556,467 12/1985 Kuhn et al. ......................... 204/193
4,561,953 12/1985 Muralidhara et al. ......... 204/157.42

FOREIGN PATENT DOCUMENTS 0072834 6/1975 Japan ............................. 204/157.42
0099923 8/1975 Japan ............................. 204/157.42

*Primary Examiner*—Robert L. Stoll
*Attorney, Agent, or Firm*—Barlow & Barlow

[57] ABSTRACT

A method of processing waste solutions containing metal salts or complex involves applying ultra-sonic vibrations to a container in which the solution is placed and treating the solution or the generated misting therefrom to insure that the metallic ions remain behind and then finally exhausting the vapor through an activated charcoal filter to remove any organic contaminants and insure that the discharge is environmentally safe.

7 Claims, No Drawings

METHOD OF PROCESSING SOLUTIONS

BACKGROUND OF THE INVENTION

The present invention relates to a method of processing a solution which includes a metal or a metal salt.

Sonic devices for imersion in materials in the liquid phase are known and have taken the form of batch processors or continuous processors. As understood to those skilled in the art, sonic generally refers to frequencies below 20 kHz and ultrasonic to those above this frequency. Plating solutions and solutions from photographic processing are usually processed using ion-exchange resin or a calcium salt or some other precipitant or flocculant. These systems are not entirely satisfactory as the sludge contains many added chemical agents that cause secondary polution.

Distillation by the use of ultra-sonics is known as for example in U.S. Pat. No. 3,367,848, but there has never been disclosed, a system for the removal of water in plating or photographic solutions and leaving behind a material that can be reprocessed to recover noble or other metals. Material treatment of a flow-thru type is disclosed in U.S. Pat. No. 4,556,467 where ultra-sonics are used.

SUMMARY OF THE INVENTION

According to the present invention, a method of processing waste water that includes dissolved metal, comprises the steps of placing the waste water in a container and applying ultra-sonic vibration to the fluid in the container.

In the preferred embodiment of the present invention, ultra-sonic vibration is applied to the waste water which includes such metals as copper, zinc, lead, cadmium, silver and gold, and then misting the water in the solution by the use of ultra-sonic vibration that evaporates when it contacts the atmosphere. The water vapor is passed through an activated charcoal filter to remove any organic contaminants and then may be exhausted to the atmosphere without any difficulty.

Accordingly, the principal object of the present invention is to provide a simple processing method for treating waste waters from photographic laboratories and small plating operations which will yield a concentrate that can be further refined.

DESCRIPTION OF THE PREFERRED EMBODIMENT

The method is preferably utilized in processing a waste water solution such as a chemical plating solution or a photographic solution. The plating solution generally contains metallic salts such as a metal salt of copper, nickel, zinc, lead, cadmium, silver, gold, and the like. In plating the salt has been formed in the solution and is reduced when the same is brought into contact with the surface of a material to be plated as a function of the reducing agent, so that the heavy metal is deposited on the surface of the material. In the waste solution of a plating bath, there will be found a heavy metal complex salt, a reducing agent and a pH adjusting agent. A photo lab waste solution contains at least cyanide, chromate and silver ions along with thiosulfate, sulfites, sulfates, bromides, carbonates, nitrates and other agents. According to the invention, ultra-sonic vibrations are applied to the waste solution and the aqueous portion is misted and when the mist contacts the atmosphere, evaporation occurs, leaving behind metal and a metal complex salt. The sludge can now be sent to a refining plant and the metal material recovered.

In experiments that have been carried out, it is found that when an ultrasonic vibration of approximately 1700 mHz is applied to a photographic waste solution having a pH of 8.5–9.0 containing 185 mg/l of Ag, the solution mists at 102 ml/hr. When the solution was treated with $H_2O_2$ to insure a precipitate, the misting rate increased to 310 ml/hr.

As a base from which to compare the experimental results, tap water was placed in the container and ultrasonic energy at 1700 mHz was applied. The misting rate was 493 ml/hr.

EXAMPLE I

| Material | Untreated Misting Rates | $H_2O_2$ Added |
|---|---|---|
| **Example I** | | |
| Photo Fixer, developer and waste water mixture, Ag concentration 1700 mg/l | 72–82 ml/hr | 305 ml/hr |
| **Example II** | | |
| Color printer waste having fixer, developer, bleach and wash water 1600 mg/l of Ag | 151 ml/hr | 310 ml/hr |
| **Example III** | | |
| Bleach fix solution, after electroplating 185 mg/l Ag | 102 ml/hr | 310 ml/hr |
| **Example IV** | | |
| Nickel plating bath 4000 mg/l Ni | 200 ml/hr | Note 1 |
| **Example V** | | |
| Bleach Fix-stabilizer, bleach and developer from washless color processor Ag 3500 mg/l; Fe 6900 mg/l | 85 ml/hr | 300 ml/hr |

(Note 1 - Adjusted for pH)

It was noted that in all of the treated solutions, those where Hydrogen Peroxide was added, there was a granular precipitant of AgS, AgO. When the resultant water vapor was condensed to a clear liquor the Ag and Fe levels were generally between 0.05 mg/l and 3.0 mg/l.

During the untreated tests, the mist vapor carried along some of the heavy metals. It was therefore necessary from an environmental standpoint to treat the solutions with hydrogen peroxide to form a precipitate. This insured that the heavy metals did not carry along with the water vapor, and a beneficial result, namely the increase in the misting rate was greatly increased, thus promoting quick processing of the waste materials.

Additional tests employing plating solutions containing materials such as $CuSO_4$, $NiSO_4$, $CuCl_2$, and the like can be precipitated by adjusting the pH until the heavy metals are no longer soluble and precipitate in the form of metal hydroxides.

As an alternate to the procedure for adjusting the solution as described above, it has been found that to prevent the metal ions from being a part of the misting output, that the mist can be heated and when this is done the metal ions return to the solution and the metal concentration in the water vapor will be below 0.05 mg/l. This procedure tends to be slower than adjusting the solution but does present a viable alternative method for processing waste water solutions.

As a further alternate to the procedure for adjusting the solution, it has been found that to prevent the metal ions from being part of the misting output, that the solution may be filtered through an anionic resin (Rohm & Haas IRA 400) or a cationic exchange resin (Rohm & Haas IR 120) to absorb the heavy metals and the ionic complexes. The resulting solution may then be evaporated by applying ultra-sonic vibrations to the container as described above. When this is done there is no need to heat the vapor as the metals in the resin can be refined out and the vapor discharged is environmentally safe.

I claim:

1. A method of processing waste solution containing a suspension of heavy metals comprising the steps of placing the solution in a container, adjusting the solution to cause the metal to percipitate by chemical reduction, applying ultra-sonic vibrations to the container to mist the water, capturing the water vapor discharge from the container, and exhausting the vapor through a filter to capture any heavy metals in the water vapor.

2. A method of processing a solution in accordance with claim 1 wherein and solution is a photographic waste solution containing silver halides, thiosulfate, alkali hydroxides, bisulfites, sulfates together with complexing agents of the EDTA, NTA group.

3. A method of processing a solution as in claim 2 wherein the solution is first treated with hydrogen peroxide to cause a precipitate of heavy metals.

4. A method of processing a solution in accordance with claim 1 wherein said solution is a waste solution of a plating bath containing a heavy metal, a complexing agent selected from the group consisting of EDTA and NTA, a peroxide solution reducing agent and a pH adjusting agent.

5. A method of processing a solution in accordance with claim 4 wherein the pH of the solution is adjusted to between 8.5–10.5 to cause a precipitate of heavy metals.

6. A method of processing waste solution containing a suspension of heavy metals comprising the steps of placing the solution in a container, applying ultra-sonic vibrations to the container substantially at a frequency of 1700 mHz to mist the water, capturing the water vapor discharge from the container, heating the water vapor, and then exhausting the water vapor through an activated charcoal filter to capture any heavy metals in the water vapor.

7. A method of processing a solution in accordance with claim 2 or 4 wherein the solution is first filtered through an ion exchange resin to absorb the heavy metals and complexes of the EDTA and NTA group.

* * * * *